United States Patent
Wang et al.

(10) Patent No.: US 9,720,742 B2
(45) Date of Patent: Aug. 1, 2017

(54) SERVICE AND SYSTEM SUPPORTING COHERENT DATA ACCESS ON MULTICORE CONTROLLER

(71) Applicant: GM GLOBAL TECHNOLOGY OPERATIONS LLC, Detroit, MI (US)

(72) Inventors: Shige Wang, Northville, MI (US); Chang Liu, Ann Arbor, MI (US); Trenton W. Haines, Novi, MI (US); James T. Kurnik, Linden, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 529 days.

(21) Appl. No.: 14/278,797

(22) Filed: May 15, 2014

(65) Prior Publication Data

US 2015/0331829 A1     Nov. 19, 2015

(51) Int. Cl.
G06F 9/52 (2006.01)
G06F 13/42 (2006.01)
G06F 13/16 (2006.01)

(52) U.S. Cl.
CPC ............ *G06F 9/52* (2013.01); *G06F 13/1642* (2013.01); *G06F 13/1673* (2013.01); *G06F 13/4243* (2013.01)

(58) Field of Classification Search
CPC . G06F 9/52; G06F 9/526; G06F 9/524; G06F 17/30171; G06F 17/30362; Y10S 707/99938
USPC .......................................................... 710/200
See application file for complete search history.

(56) References Cited

U.S. PATENT DOCUMENTS

| | | | | |
|---|---|---|---|---|
| 4,399,467 A | * | 8/1983 | Subramaniam | H04N 1/415 341/57 |
| 5,365,283 A | * | 11/1994 | Doherty | H04N 9/3179 348/514 |
| 5,727,233 A | * | 3/1998 | Lynch | G06F 13/385 710/35 |
| 6,173,442 B1 | | 1/2001 | Agesen et al. | |
| 7,484,028 B2 | * | 1/2009 | Raju | G06F 13/28 710/301 |
| 7,571,301 B2 | | 8/2009 | Kejariwal et al. | |
| 7,577,798 B1 | | 8/2009 | Moir et al. | |
| 7,657,673 B2 | * | 2/2010 | Ueda | G06F 13/385 345/539 |

(Continued)

OTHER PUBLICATIONS

Mellor-Crummey, et al., "Scalable Reader-Writer Synchronization for Shared-Memory Multiprocessors," ACM 1991, 8 pages.*

(Continued)

*Primary Examiner* — Brian Misiura
(74) *Attorney, Agent, or Firm* — John A. Miller; Miller IP Group, PLC

(57) ABSTRACT

A system and method for accessing coherent data on a controller. The system and method include a first buffer and a second buffer that each may be read from or written to and an indicator that indicates which of the first or the second buffer is read from while the other of the first or second buffers is written to. The system and method also include a read synchronization protocol that allows the coherent data to be read from the buffer that the indicator indicates is the read buffer and a write synchronization protocol that allows the coherent data to be written to the buffer that the indicator indicates is the write buffer.

17 Claims, 4 Drawing Sheets

(56) References Cited

U.S. PATENT DOCUMENTS

| | | | |
|---|---|---|---|
| 7,747,996 B1 | 6/2010 | Dice | |
| 7,984,248 B2 * | 7/2011 | Kottapalli | G06F 9/528 |
| | | | 711/150 |
| 8,095,727 B2 | 1/2012 | Rushworth et al. | |
| 8,279,796 B1 * | 10/2012 | Cleveland | H04B 1/0035 |
| | | | 370/319 |
| 8,321,635 B2 * | 11/2012 | Ish | G06F 9/3004 |
| | | | 711/141 |
| 8,804,212 B2 * | 8/2014 | Ryu | H04N 1/0473 |
| | | | 358/474 |
| 9,378,072 B2 * | 6/2016 | Wang | G06F 9/546 |
| 2007/0169123 A1 | 7/2007 | Hopkins | |
| 2010/0125695 A1 * | 5/2010 | Wu | G06F 3/0613 |
| | | | 711/103 |
| 2012/0140861 A1 | 6/2012 | Menon et al. | |
| 2012/0324067 A1 * | 12/2012 | Hari | G06F 13/385 |
| | | | 709/222 |

OTHER PUBLICATIONS

Wang, Shige, Utility U.S. Appl. No. 14/158,581, filed Jan. 17, 2014, entitled "Method and Lightweight Mechanism for Mixed-Critical Applications".

* cited by examiner

SERVICE AND SYSTEM SUPPORTING COHERENT DATA ACCESS ON MULTICORE CONTROLLER

BACKGROUND OF THE INVENTION

Field of the Invention

This invention relates generally to a system and method for supporting coherent data access on a multicore controller and, more particularly, to a system and method that provides two buffers, an indicator, and a synchronization protocol that allows one buffer to be read from while the other buffer is written, and where read and write responsibilities switch between the two buffers.

Discussion of the Related Art

Modern vehicles employ various embedded electronic controllers that improve the performance, comfort, safety, etc. of the vehicle. Such controllers include engine controllers, suspension controllers, steering controllers, power train controllers, climate control controllers, infotainment system controllers, chassis system controllers, etc. These controllers typically require special purpose software and algorithms to perform their control functions.

The current trend for vehicle electronic controllers is to provide multiple software applications for different functions operating on a common controller. For example, adaptive cruise control (ACC) systems, lane centering systems, stability control systems, etc. are all known in the art and all of which automatically control vehicle steering and/or braking in some fashion. These systems often times employ the same sensor inputs and other variables, sometimes referred to as global variables, that when stored in memory can be used by more than one software application. For example, the ACC system may read the sensor data and write the sensor data into the controller memory during its operation on the processor, and the lane centering system and other software applications may read that data when they are running on the processor. Thus, it makes sense in many cases such as these to run multiple software applications on the same processor.

Providing multiple related software applications running on a common controller has obvious advantages for reducing system hardware and cost. However, operating different software applications on the same processor increases the complexity of the controller because of the scheduling required to run the different software applications and prevent the software applications from interfering with each other. Such mixed use applications operating on a single processor is further increased in complexity when a vehicle OEM provides additional software on a controller already having software provided by a supplier.

In multiple related software applications and/or multicore computer environments, if one or more software applications of execution attempt concurrent operations on the same critical resources a problem may arise. For example, when the software applications attempt simultaneous access to a shared data record that needs to be updated atomically, it may cause a race condition that in turn may cause a program failure. Synchronization procedures are used to prevent these conditions from occurring. Known synchronization methods use locking mechanisms or lock-free mechanisms to provide software application access to critical resources to prevent race conditions, and similar problems, from occurring.

Locking mechanisms use a method that permits only one software application at a time to acquire a lock and subsequently conduct processing operations on a critical resource. When a software application holds a lock to a critical resource, other software applications attempting to access the critical resource will be paused and placed in a waiting queue. Once the lock is released, the next software application at the head of the waiting queue will be given the lock and allowed to proceed with processing operations. While the locking synchronization approach discussed above prevents race conditions, the necessary pausing of software applications slows down processing. Additionally, if a software application holding the lock fails to complete processing, the program may become unresponsive.

Another known method, commonly referred to as lock-free synchronization, guarantees that only one software application can update a critical resource. If a second software application attempts to update while a first software application is updating critical resource, the second software application's attempt will fail. If the second software application fails it will restart the update attempt after the first software application completes updating to the critical resource. While lock-free synchronization can produce greater execution performance compared to locking synchronization, it is not always possible to implement for some critical resources. Other known approaches, such as those that are wait-free, require excessive memory and require a minimum of three copies of data sets.

SUMMARY OF THE INVENTION

The following disclosure describes a system and method for accessing coherent data on a controller. The system and method include a first buffer and a second buffer that each may be read from or written to and an indicator that indicates which of the first or the second buffer is read from while the other of the first or second buffers is written to. The system and method also include a read synchronization protocol that allows the coherent data to be read from the buffer that the indicator indicates is the read buffer and a write synchronization protocol that allows the coherent data to be written to the buffer that the indicator indicates is the write buffer.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for supporting coherent data access on a multicore controller is merely exemplary in nature, and is in no way intended to limit the invention or its applications or uses. For example, while a vehicular application is discussed, the system and method described herein may be used in any computing environment.

Figure 1:
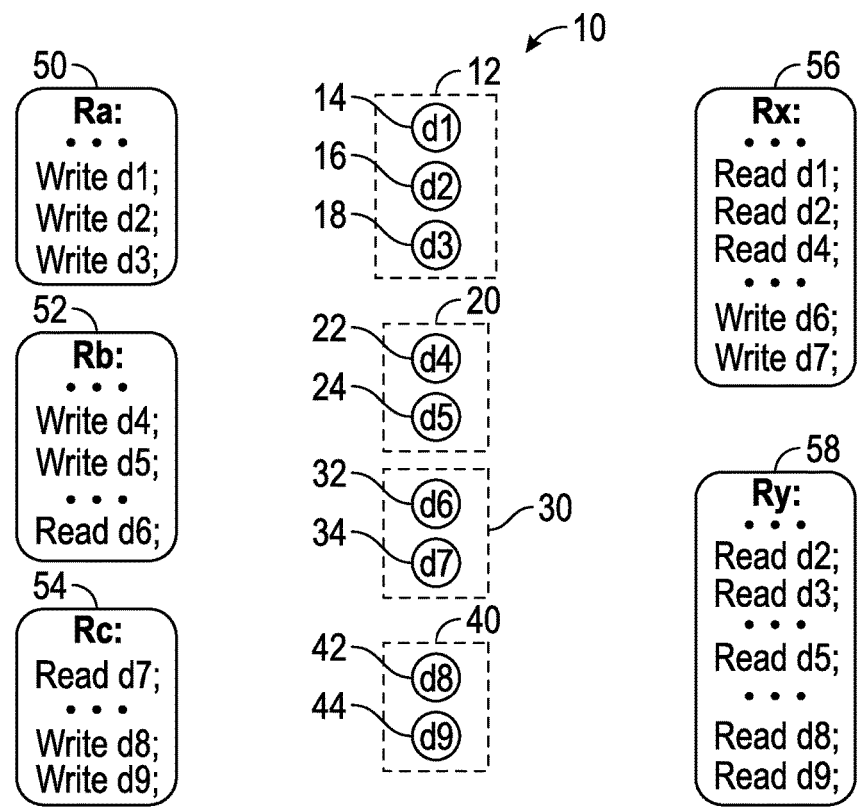
FIG. 1 is an illustration of coherent data that must be updated together, i.e., coherently by the same provider runnable.

FIG. 1 is an illustration of coherent data 10 that must be updated together by the same runnable, or software application. As used herein "runnable" includes a small executable software component or software function. Data group 12 that includes related data 14, 16 and 18 must be updated such that the data 14, 16 and 18 are updated together (i.e., coherently) by the same provider runnable Ra, represented by box 50. For example, the data 14, 16 and 18 may represent x-, y-, and z-axis global positioning satellite (GPS) location data of a vehicle. Data group 20 that includes related data 22 and 24 must be updated such that the data 22 and 24 are updated together by the same provider runnable, represented by box 52. For example, the data 22 and 24 may represent engine cylinder position and camshaft phase position. A wide variety of coherent data groups may be present in a vehicle electronic controls unit (ECU), as is apparent to those skilled in the art. Data group 30 includes related data 32 and 34 that must be updated together by the same provider runnable, represented by box 56, and data group 40 includes related data 42 and 44 that must be updated together by the same provider runnable, represented by box 54.

Each of the data 14, 16, 18, 22, 24, 32, 34, 42 and 44 are basic, or atomic, building block elements of executable programs. While the data groups 12, 20, 30 and 40 must be written together, the data 14, 16, 18, 22, 24, 32, 34, 42 and 44 may be read together according to different groups. At box 50 the data 14, 16 and 18 are all written, or updated, together. For example, if the data 14, 16 and 18 represent x-, y-, and z-coordinates of a vehicle, e.g., longitude, latitude and altitude, the location of the vehicle may not be accurately determined if the data 16 and 18 has updated and 14 has not. Thus, it is important in this situation to update the data 14, 16 and 18 together. In another example at box 52, the data 22 and 24 are written together and the data 32 is read by itself for a particular application. In another example at box 54, the data 34 is read by itself and the data 42 and 44 are written by a particular application. In another example at box 56, the data 14, 16 and 22 are read together and the data 32 and 34 are written together by a particular application. The data 14 and 16 read by the provider runnable at the box 56 must be coherent, meaning that 14 and 16 as read by the provider runnable at the box 56 must be updated by the provider runnable at the box 50 coherently at a previous time, such as the longitude and latitude coordinates of the vehicle discussed above. In another example at box 58, the data 16 and 18 are read together and they must be coherently updated by the provider runnable at the box 50, the data 24 is read by itself, and the data 42 and 44 are read together after they have been coherently updated by the provider runnable at the box 54. The examples 50, 52, 54, 56 and 58 illustrate that in a computing environment the reading coherency may happen in a variety of ways. Furthermore, different runnables may read different versions of coherent data. For example, the data 16 at the box 56 may not be the same data 16 read at the box 58. Thus, runnables may execute in true parallel using scattered data in the memory, without the need for the use of locking synchronization or the lock-free synchronizations methods that are known in the art, thereby avoiding the problems associated with these approaches and identified above.

The locking synchronization that is known in the art and discussed above involves locking synchronization on data access. In the present application, locking of the operating system (OS) scheduler is proposed to synchronize the protocols described below. The locking of the OS scheduler is to prevent the current software execution from being preempted by a higher priority OS task on the same core. This is to ensure that the read or write access of the coherent data can be done as fast as possible.

Figure 2:
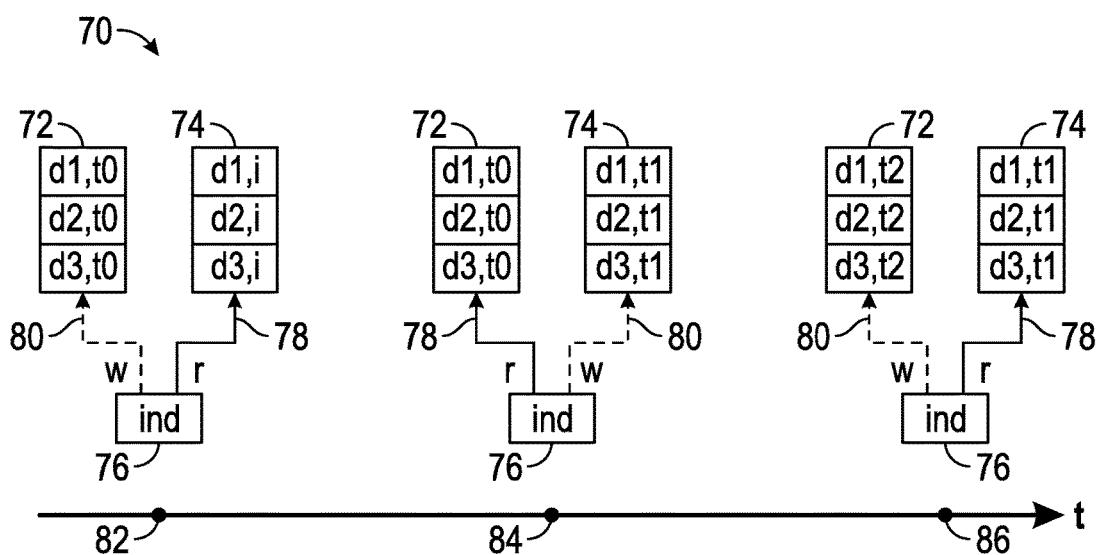
FIG. 2 is an illustration of a system that includes two buffers and an indicator.

FIG. 2 is an illustration of a system 70 that allows the data groups 12, 20, 30 and 40 to be written together in a manner that is fast, reliable and does not require large amounts of memory and that uses two buffers. The system 70 includes a first buffer 72, a second buffer 74 and an indicator 76. The indicator 76 indicates which of the buffers 72 and 74 is to be read from. When a runnable Rr reads, the runnable will determine which of the buffers 72 or 74 the indicator 76 is indicating to as the buffer to be read from. The runnable will read the desired coherent data from the indicated buffer 72 or 74. When a runnable Rw writes, the runnable determines which of the buffers 72 or 74 the indicator 76 indicates is to be read from, and writes to the buffer 72 or 74 that the indicator 76 is not indicating or pointing to. In other words, the indicator always points to the read buffer, so the other buffer is implicitly indicated as the write buffer. A synchronization protocol, described below, is used in combination with the buffers 72 and 74, one for reading and the other for updating/writing, and the indicator 76 allows the system 70 to take advantage of a single writer, which is a widely used design standard for safety critical software applications, thereby keeping costs low while providing updated core data without the delay of locking mechanisms, wait times, expensive components, or the potential for runnable errors as described above.

Returning to FIG. 2, at time t0, shown at point 82, the buffer 74 is being pointed to by the indicator 76 as the buffer to be read from, shown by arrow 78. The buffer 72 is indicated by the indicator 76 as the buffer to be written to or updated to, as shown by the dashed arrow 80. At time t1, shown at point 84, the writing to the buffer 72 is complete and the indicator 76 switches. Thus, the indicator 76 points to the buffer 72 as the buffer to be read from, shown by the arrow 78, while the buffer 74 is pointed to as the buffer to write to. At time t2, shown at point 86, the indicator 76 has switched again such that the buffer 74 has the arrow 78 pointing to the buffer 74 as the read buffer while buffer 72 is indicated as the write buffer by the indicator 76 as shown by the dashed arrow 80. In this way, coherent data is never blocked from runnables while the risk for coherent data being read when only partially updated does not occur. Thus, in operation the system 70 provides for a single write at any time, has multi-read in parallel capability, does not require global (i.e., multicore) schedule control, and accesses to the coherent data may occur at different operating system task rates and on different cores.

Figure 3:
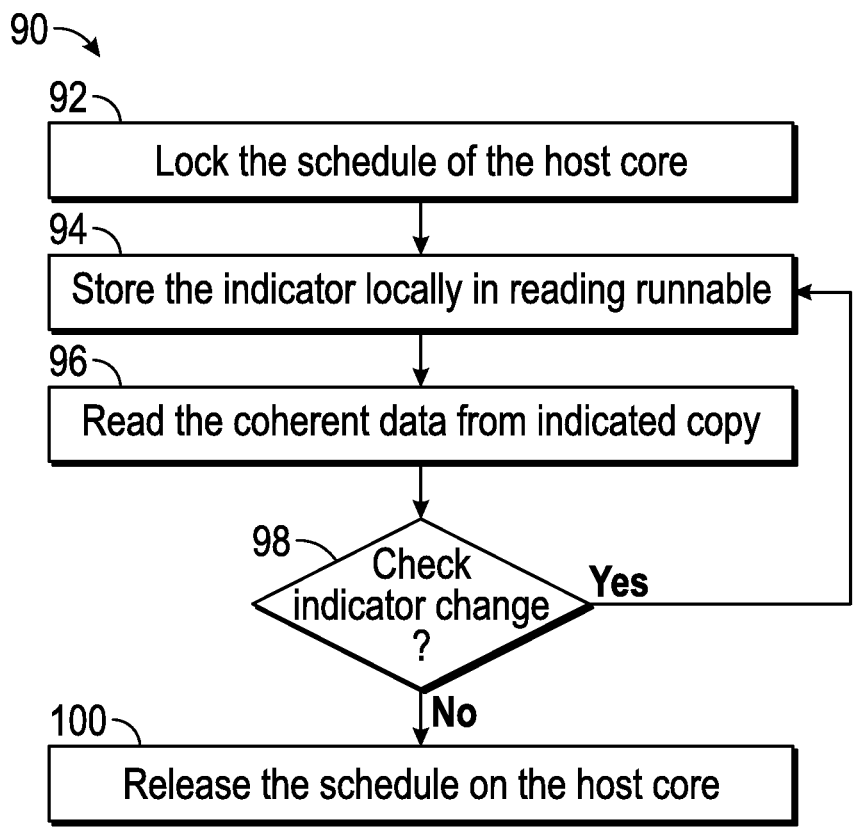
FIG. 3 is a flow diagram of a synchronization protocol for a read portion of the system shown in FIG. 2.

FIG. 3 is a flow diagram of a synchronization protocol or algorithm 90 for the read portion of the system 70 that operates to prevent parallel access of the indicator 76 on different cores or runnables. At box 92, the operating system (OS) scheduler of the host core (only for host core), i.e., the core where the current code is executing, is locked to ensure that higher priority task preemption will not occur. At box 94, the indicator 76 is stored locally in the reading runnable to prevent corruption from occurring due to the switching process of the indicator 76 described above. Next, the coherent data is read from the indicated read buffer at box 96. At decision diamond 98, the algorithm checks to see if the indicator 76 has switched to a different buffer. If the indicator 76 is now pointing to a different buffer, that means that the buffer just read has become the write buffer sometime during the previous read access 96, thus the data just read may not be coherent. If the indicator 76 has switched the data needs to be read again, the algorithm returns to the box 94 and stores the indicator locally again, thereby providing the most recently updated coherent data. If, at the decision diamond 98, the indicator 76 has not switched buffers since the indicator was stored locally at the box 94, the data read coherency is guaranteed, the OS scheduler is released, meaning the coherent data read access has been completed on the host core at box 100.

Figure 4:
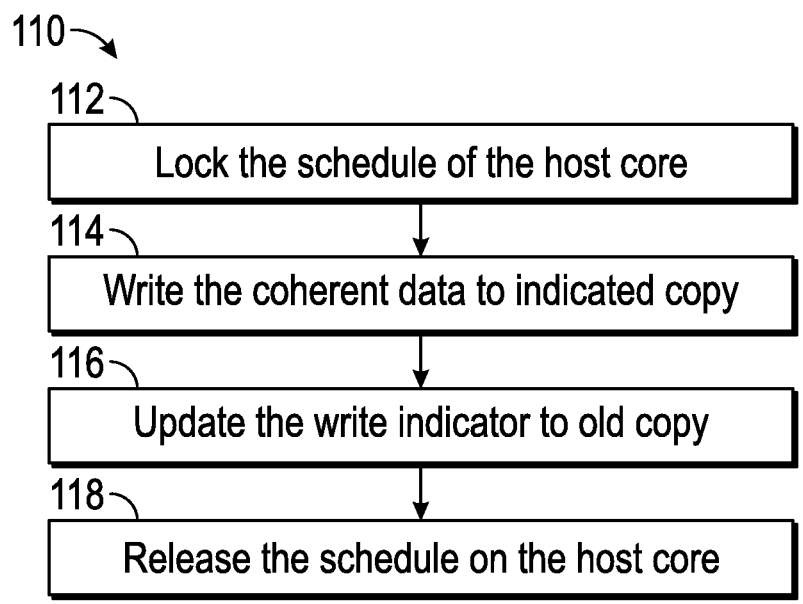
FIG. 4 is a flow diagram of a synchronization protocol for a write portion of the system shown in FIG. 2.

FIG. 4 is a flow diagram of a synchronization protocol or algorithm 110 for the write portion of the system 70 described above. At box 112, the OS scheduler of the host core is locked so that the higher priority task preemption is prevented. At box 114, the coherent data is written to the buffer indicated as the write buffer by the indicator 76. At box 116, the indicator 76 switches to indicate the updated data as the read buffer because new writing has just completed at the box 114. At box 118, the OS scheduler is released on the host core. The buffers 72 and 74 switch from being the read buffer and the write buffer in the manner described above with respect to FIG. 2 using the algorithms 90 and 110. The writing algorithm 110 is simpler than the reading algorithm 90 because the writing algorithm 110 does not need to be concerned with the reading process. The read algorithm 90 checks to see when the indicator 76 switches, which works well because the writing algorithm 110, although simpler, takes longer to complete than the reading algorithm 90. Again, the purpose of locking the OS scheduler is to ensure that either write access or read access to the coherent data can be completed as quickly as possible.

Figure 5:
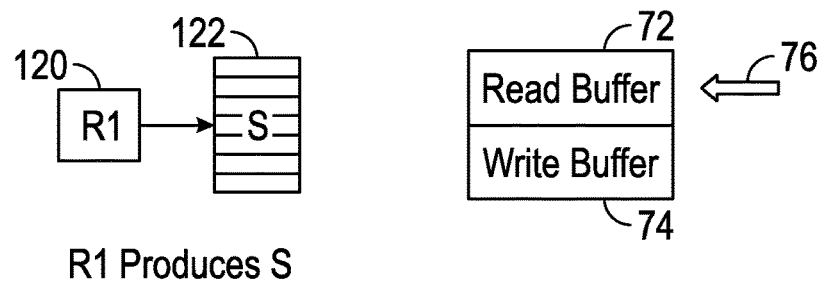
FIG. 5 is an illustration of a particular software runnable R1 utilizing the system of FIG. 2.

FIG. 5 illustrates a software runnable R1 shown at box 120 that runs at a 2.5 millisecond task rate and provides a set of coherent signals S at box 122, which is a set of signals that must be accessed coherently, such as the x-, y- and z-coordinates described above. Two buffers, such as the buffers 74 and 76 described above, are created for the set of coherent signals S. At the same time that the buffers 72 and 74 are created, a "read_index" variable, shown as the indicator 76, is created to indicate which of the two buffers 72 and 74 should be used for read access. The other buffer will be used for write access only at that time. Switching occurs as described in FIG. 2 above, i.e., at any instance in time one buffer will be the read buffer and the other buffer will be the write buffer.

Figure 6:
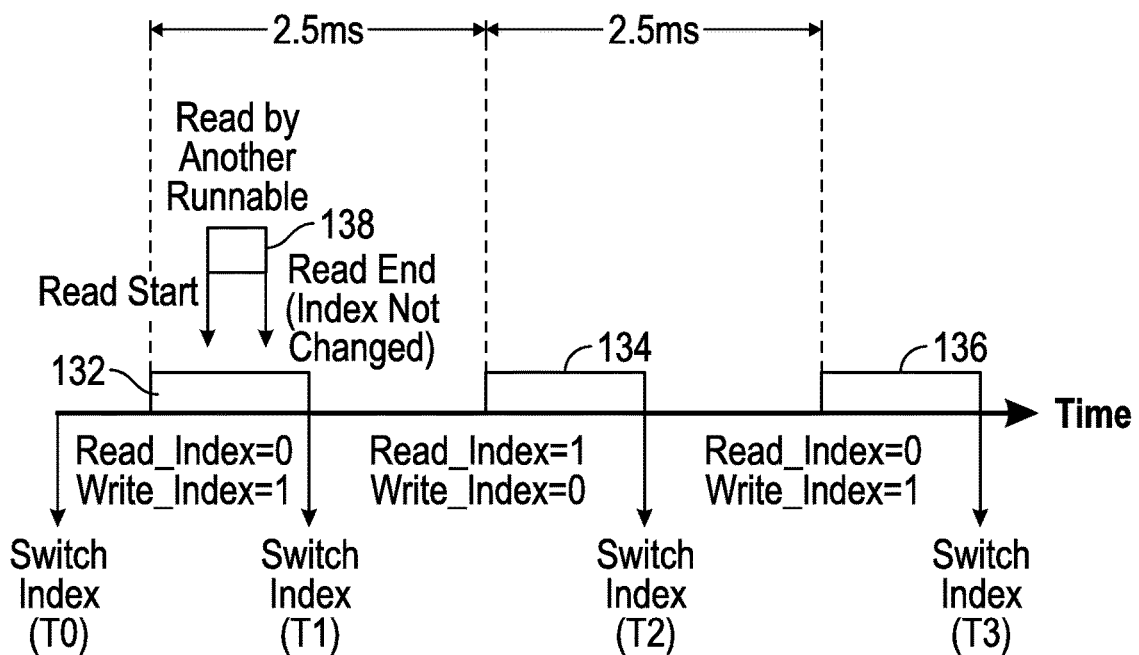
FIG. 6 is a time line illustrating the software runnable R1 of FIG. 5 over time and another software runnable R2 trying to read the coherent data provided by R1.
Figure 7:
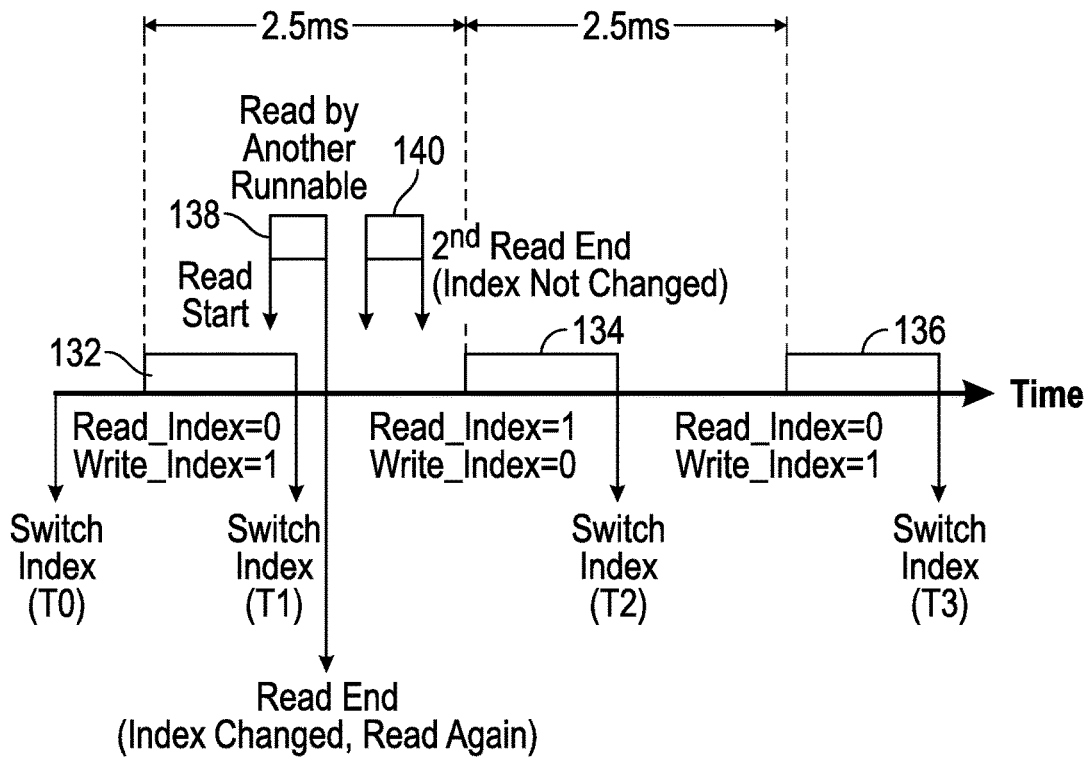
FIG. 7 is another time line illustrating the software runnable R1 and the second software runnable R2 over time.
Figure 8:
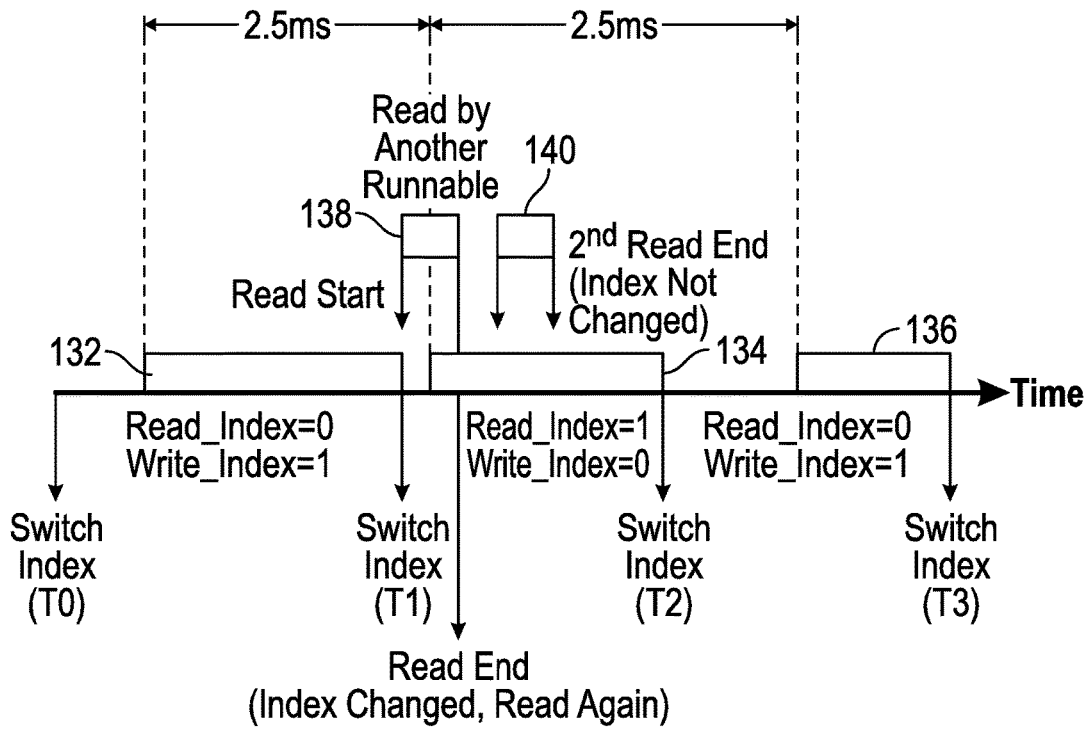
FIG. 8 is another time line illustrating the software runnables R1 and R2 over time.

FIGS. 6-8 illustrate an example time line showing the software runnable R1 of FIG. 5 in operation over time. In FIG. 6, at boxes 132, 134 and 136 R1, executes every 2.5 milliseconds. Thus, once R1 executes at the box 132, 2.5 milliseconds later R1 will execute again at the box 134, then 2.5 milliseconds after that R1 will execute again at the box 136. At the end of each execution at the boxes 132, 134 and 136, the indicator 76 switches the read buffer and the write buffer because R1 produces a new set of signals S every 2.5 milliseconds. The individual signals of S may be produced at any time during the R1 execution at the boxes 132, 134 and 136. At box 138 another software runnable R2 needs to read S asynchronously and coherently. The software runnable R2 at the box 138 compares the "read_index", i.e., the indication of the indicator 76 at a Read Start and Read End using the algorithm 90. If the indicator 76 does not change, the coherent data read is completed successfully because the read buffer always contains coherent data.

FIG. 7 is another time line illustrating the software runnables R1 and R2. As shown in FIG. 7, if the indicator 76 has switched from pointing to, for example, the buffer 72 to the buffer 74 during the read access, the data read by the software runnable R2 is repeated at box 140 until no change is detected from the indicator 76 between the start of the read and the end of the read at the box 132.

FIG. 8 is another time line illustrating the software runnables R1 and R2 that shows an extended execution time of R1 at the box 132 where the signals S update during the read of the second software runnable R2 at the box 138. The second software runnable R2 reads again at box 140, and at the box 140 the R2 finishes the read before S is updated again at the end of the execution at the box 134 (at which time the indicator 76 switches).

The benefits provided by the system and method described herein is a system that is wait-free and lock-free and that guarantees the write and read will proceed in the presence of parallel access with no priority inversion. The data accessed is guaranteed to be coherent.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for accessing coherent data on a controller, said method comprising:
   providing a first buffer and a second buffer that each may be read from or written to;
   providing an indicator that indicates which of the first or the second buffer is a read buffer where the indication of the read buffer causes the other of the first or second buffer to be a write buffer;
   executing a read synchronization protocol that allows the coherent data to be read from the read buffer; and
   executing a write synchronization protocol that allows the coherent data to be written to the write buffer, wherein the coherent data that must be written together is grouped into data groups.

2. The method according to claim 1 wherein the coherent data is atomic elements of executable programs.

3. The method according to claim 1 wherein the indicator switches from indicating the write buffer to indicating said write buffer as the read buffer upon completion of the writing process.

4. The method according to claim 1 wherein executing the read synchronization protocol further includes storing the indicator locally in a reading runnable to prevent corruption from occurring due to the indicator changing the indication of which buffer is the read buffer and which buffer is the write buffer.

5. The method according to claim 4 wherein executing the read synchronization protocol further includes determining if the indicator changed the indication of which buffer is the read buffer and which buffer is the write buffer during the read, and if so, storing the indicator locally again and reading again to attain the most recently updated coherent data.

6. The method according to claim 1 wherein executing the write synchronization protocol further includes locking an operating system scheduler of a host core so that the coherent data may be written to the write buffer without higher priority task preemption such that the writing of the coherent data is performed as fast as possible.

7. A method for accessing coherent data on a vehicle controller, said vehicle controller operating a plurality of software applications, said method comprising:
proving a first buffer and a second buffer that each may be read from or written to;
providing an indicator that indicates which of the first or the second buffer is a read buffer where the indication of the read buffer causes the other of the first or the second buffer to be a write buffer, wherein the indicator switches the indication after writing to the write buffer is complete;
executing a read synchronization protocol that allows coherent data to be read from the read buffer, wherein executing the read synchronization protocol further includes locking an operating system scheduler of a host core to ensure task preemption does not occur during the read synchronization protocol and storing the indicator locally in a reading runnable to prevent corruption from occurring due to the indicator changing the indication of which buffer is the read buffer and which buffer is the write buffer; and
executing a write synchronization protocol that allows coherent data to be written to the write buffer.

8. The method according to claim 7 wherein the coherent data that must be written together is grouped into data groups.

9. The method according to claim 7 wherein the coherent data is atomic elements of executable programs.

10. The method according to claim 7 wherein the plurality of software applications control vehicle functions.

11. The method according to claim 7 wherein the read synchronization protocol further includes determining if the indicator changed the indication of which buffer is the read buffer and which buffer is the write buffer during the read, and if so, storing the indicator locally again and reading again to attain the most recently updated coherent data.

12. The method according to claim 7 wherein the write synchronization protocol further includes locking the OS scheduler of a host core so that the coherent data may be written to the write buffer as fast as possible without being preempted by higher priority OS tasks, and releasing the schedule of the host core after writing is complete and the indicator has switched.

13. A system for accessing coherent data on a controller, said system comprising:
first and second buffers that each may be read from or written to;
an indicator that indicates which of the first or the second buffer is a read buffer where the indication of the read buffer causes the other of the first or second buffer to be a write buffer;
a read synchronization protocol that allows coherent data to be read from the read buffer; and
a write synchronization protocol that allows coherent data to be written to the write buffer, wherein the coherent data is atomic elements of executable programs.

14. The system according to claim 13 wherein the indicator switches indicating the write buffer to indicating said write buffer as the read buffer upon completion of the writing process.

15. The system according to claim 14 wherein the read synchronization protocol further includes determining if the indicator has switched during the read, and if so, storing the indicator again and reading again to attain the most recently updated coherent data.

16. The system according to claim 13 wherein the write synchronization protocol further includes locking the OS scheduler of a host core so that the coherent data may be written to the write buffer as fast as possible without being preempted by higher priority OS tasks.

17. A method for accessing coherent data on a controller, said method comprising:
providing a first buffer and a second buffer that each may be read from or written to,
providing an indicator that indicates which of the first or the second buffer is a read buffer where the indication of the read buffer causes the other of the first or second buffer to be a write buffer;
executing a read synchronization protocol that allows the coherent data to be read from the read buffer; and
executing a write synchronization protocol that allows the coherent data to be written to the write buffer, wherein executing the write synchronization protocol further includes locking an operating system scheduler of a host core so that the coherent data may be written to the write buffer without higher priority task preemption such that the writing of the coherent data is performed as fast as possible.

* * * * *